(No Model.)
C. F. BRUSH.
PROCESS OF MAKING ELEMENTS FOR SECONDARY BATTERIES.
No. 262,533. Patented Aug. 8, 1882.
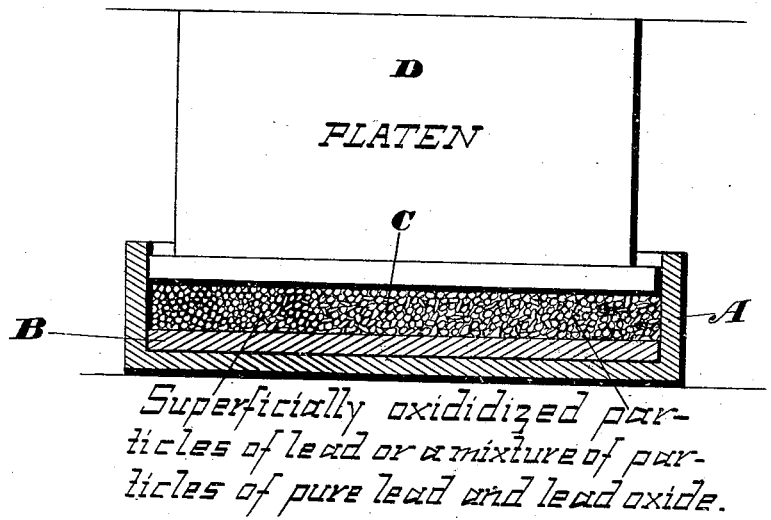
Superficially oxidized particles of lead or a mixture of particles of pure lead and lead oxide.
WITNESSES
INVENTOR
Attorneys

UNITED STATES PATENT OFFICE.

CHARLES F. BRUSH, OF CLEVELAND, OHIO.

PROCESS OF MAKING ELEMENTS FOR SECONDARY BATTERIES.

SPECIFICATION forming part of Letters Patent No. 262,533, dated August 8, 1882.

Application filed May 27, 1882. (No model.)

*To all whom it may concern:*

Be it known that I, CHARLES F. BRUSH, of Cleveland, in the county of Cuyahoga and State of Ohio, have invented certain new and useful Improvements in a Process for Making Elements for Secondary or Storage Batteries; and I do hereby declare the following to be a full, clear, and exact description of the invention, such as will enable others skilled in the art to which it pertains to make and use the same.

My invention relates to secondary or storage electric battery elements; and said invention consists in the following-described method or process of making said elements.

A battery element constructed according to my process will have a supporting and electro-conducting body or core of lead, (or an alloy of lead and platinum or other suitable material,) and upon one or more or all of the sides or surfaces of said core or body will be welded a coating consisting of lead and oxide of lead, that have been united by pressure into a compact and firmly-coherent mass. If particles of pure lead are collected and subjected to very heavy pressure, they will be welded together into a single solid body that will have every appearance of having been cast or rolled, all evidence of the former particles having entirely disappeared. Now, if these particles of lead have their surfaces oxidized, so that each will be enveloped by a coating or film of lead oxide, and if such oxidized particles are subjected to the welding pressure above referred to, they will be welded together into a compact and firmly-coherent mass, for during the pressure to which they are subjected the particles must change their form, and this results in a rupture of the coatings of lead oxide, thus exposing some of the pure lead of each particle, and where the exposed pure lead surfaces of neighboring particles abut against each other there will be a perfect weld, and these welded points will make the entire mass compact and firmly coherent, sufficiently so for all the purposes of a secondary battery. The mass thus formed will consist of lead throughout which in all directions ramifies and extends minute veins, sheets, or membranes of oxide of lead.

In preparing the above mass or substance I prefer to employ finely-divided lead—that is, lead in a granulated, pulverized, or precipitated state prior to its superficial oxidation, as specified.

Instead of oxidizing the surfaces of lead particles and welding them together, as described, a similar mass or substance to the one thus produced can be made by thoroughly mixing together about equal quantities in bulk of pure or non-oxidized lead particles with oxide of lead and submitting this mixture to welding-pressure, when the abutting surfaces of the lead particles will weld together and the oxide of lead will be retained among them, thus forming veins of lead oxide throughout the entire mass.

In carrying out my process of making secondary-battery elements, take a supporting body or core of lead in any form or of any size desired, and cover one or more or all of its sides either with the superficially-oxidized lead particles or the mixture of oxide of lead and pure or non-oxidized lead particles hereinbefore described, and apply the welding-pressure referred to, which will result not only in welding the said particles into a firmly-coherent mass, but will also weld the mass to the supporting body or core of lead.

I do not in any manner or degree limit myself to any shape, size, or dimension that the supporting core or body shall have; nor does it matter exactly how the welding-pressure shall be applied, so long as it is sufficient to accomplish the results specified.

Instead of employing pure lead as the material for the supposing body or core, any suitable alloy of lead and platinum or other alloy or substance can be used.

My invention broadly consists in and comprehends the employment of any substance to which lead can be welded or equivalently attached, and which will also be as good an electro-conductor practically as lead.

My process can be practiced not only in making secondary-battery elements at one operation, but also in making material from which said elements can afterward be constructed. Thus, for instance, sheets, rods, or bars of lead can be coated, as specified, with the lead and lead-oxide mass, and afterward be cut into suitable pieces or fashion for any special form of battery elements desired.

The drawing represents a press-box, A, having a plate or support, B, placed therein and covered with superficially-oxidized particles of lead, or a mixture of particles of pure lead and lead oxide, C, and a platen, D, for subjecting the same to pressure and welding the particles to the core or support.

For the sake of convenience in identifying this invention among others that I have made relating to the class of secondary batteries, I shall denominate it as "Case O."

What I claim is—

A process for making secondary or storage electric battery elements, or material from which said elements can be constructed, said process consisting in covering one or more or all of the surfaces of a suitable metallic and electro-conducting core or body either with superficially-oxidized particles of lead or with a mixture of particles of pure lead and lead oxide, and afterward applying pressure sufficient both to weld said particles or mixture into a compact and firmly-coherent mass and to weld the mass to said core or body, substantially as specified.

In testimony whereof I have signed my name to this specification in the presence of two subscribing witnesses.

CHARLES F. BRUSH.

Witnesses:
 LEVERETT L. LEGGETT,
 ELBERT H. BAKER.